(12) United States Patent
Wendt

(10) Patent No.: US 11,867,232 B2
(45) Date of Patent: Jan. 9, 2024

(54) FORGED OUTER RING

(71) Applicant: AKTIEBOLAGET SKF, Gothenburg (SE)

(72) Inventor: Volker Wendt, Üchtelhausen/Zell (DE)

(73) Assignee: AKTIEBOLAGET SKF, Gothenburg (SE)

( * ) Notice: Subject to any disclaimer, the term of this patent is extended or adjusted under 35 U.S.C. 154(b) by 52 days.

(21) Appl. No.: 17/829,424

(22) Filed: Jun. 1, 2022

(65) Prior Publication Data
US 2022/0389966 A1    Dec. 8, 2022

(30) Foreign Application Priority Data

Jun. 8, 2021 (DE) .......................... 102021205780.2

(51) Int. Cl.
| | |
|---|---|
| F16C 33/58 | (2006.01) |
| F16C 33/64 | (2006.01) |
| F16C 19/38 | (2006.01) |
| F16C 19/36 | (2006.01) |
| B21K 1/04 | (2006.01) |
| B21J 5/02 | (2006.01) |
| B21J 13/02 | (2006.01) |

(52) U.S. Cl.
CPC ............. *F16C 33/585* (2013.01); *B21J 5/022* (2013.01); *B21J 13/02* (2013.01); *B21K 1/04* (2013.01); *F16C 19/364* (2013.01); *F16C 19/386* (2013.01); *F16C 33/64* (2013.01); *F16C 2220/46* (2013.01)

(58) Field of Classification Search
CPC .... F16C 19/364; F16C 19/386; F16C 33/585; F16C 33/64; F16C 2220/46; B21J 5/02; B21J 5/022; B21K 1/04
See application file for complete search history.

(56) References Cited

U.S. PATENT DOCUMENTS

| | | | | |
|---|---|---|---|---|
| 3,727,999 A | * | 4/1973 | Dunn ...................... | F16H 55/06 384/910 |
| 5,882,123 A | * | 3/1999 | Lee .......................... | B21H 1/12 384/571 |
| 7,191,633 B1 | * | 3/2007 | Uehara ...................... | B21J 5/02 72/355.6 |

(Continued)

FOREIGN PATENT DOCUMENTS

| | | | |
|---|---|---|---|
| DE | 1808447 A1 | * 7/1969 | |
| DE | 19914969 A1 | * 10/2000 | ............... B21K 1/04 |

(Continued)

*Primary Examiner* — Phillip A Johnson
(74) *Attorney, Agent, or Firm* — J-TEK LAW PLLC; Scott T. Wakeman; Mark A. Ussai

(57) ABSTRACT

A forged outer ring of a tapered wheel bearing incudes a conical ring section having a first end and a second end, a flange section and a central ring section having a first end at the flange section and a second end at the conical ring section. An inner surface of the conical ring section is configured to form a raceway for a first set of tapered rollers. An inner diameter of the first end of the conical ring section is smaller than an inner diameter of the second end of the central ring section and a wall thickness of the second end of the conical ring section is greater than a wall thickness of the first end of the conical ring section.

15 Claims, 4 Drawing Sheets

(56) References Cited

U.S. PATENT DOCUMENTS

| | | | | |
|---|---|---|---|---|
| 8,516,705 B2 * | 8/2013 | Kobayashi | ............. | F16C 33/64 |
| | | | | 29/898.04 |
| 9,546,683 B2 * | 1/2017 | Vissers | .................. | F16C 33/60 |
| 2012/0210765 A1 * | 8/2012 | Nakamizo | ............... | F16C 33/64 |
| | | | | 72/352 |

FOREIGN PATENT DOCUMENTS

| | | | | |
|---|---|---|---|---|
| DE | 19914969 A1 | 10/2000 | | |
| FR | 2899293 A1 * | 10/2007 | ......... | B60B 27/0005 |
| JP | 2004290983 A * | 10/2004 | | |
| WO | WO-2013085008 A1 * | 6/2013 | ............. | B21J 5/025 |

\* cited by examiner

FORGED OUTER RING

CROSS-REFERENCE

This application claims priority to German patent application no. 10 2021 205 780.2 filed on Jun. 8, 2021, the contents of which are fully incorporated herein by reference.

TECHNOLOGICAL FIELD

The present invention relates to a forged outer bearing ring.

BACKGROUND

From the prior art an outer ring is known, in particular for a wheel bearing, that is manufactured by a drop-forging method. Here a relatively thin-walled blank is manufactured for the outer ring, and the outer ring is subsequently widened in areas by an axial open die forging step such that it obtains its final shape. This produces an outer ring that has an encircling recess on its outer casing surface. The recess is axially disposed in a region where the wall thickness of the outer ring without recess is greater than a value required for a sufficient stability of the outer ring so that the mechanical properties of the outer ring are not negatively influenced by the recess in an impermissible manner. The recess also makes possible a material saving and thus makes possible a more cost-effective manufacturing with respect to the material consumption. It also leads to a significant reduction of the weight of the outer ring, which is desirable in particular with a use in a wheel bearing.

However, it is disadvantageous with such an outer ring that forming the recess or the forging process generally leads to a conically tapering wall thicknesses toward at least one edge region of the outer ring. However, since this edge region of the outer ring is particularly stressed in the operation of the bearing, the tapered wall sections form a weak point with the result that the entire bearing ring cannot be formed arbitrarily thin, or the service life and load-bearing capacity of the bearing will be limited.

SUMMARY

It is therefore an aspect of the present disclosure to provide a forged outer ring that on the one hand is as light as possible, but on the other hand has an increased load-bearing capacity.

In the following a forged outer ring for a tapered roller bearing, in particular a wheel bearing, is presented that includes at least one first conical ring section having a small inner diameter and a large inner diameter, on whose inner side a raceway is formed for a first set of tapered rollers. Furthermore, the outer ring comprises a flange-ring section that is configured to attach the outer ring to a component and a central ring section that is disposed between the conical ring section and the flange section. Here the small inner diameter of the conical ring section corresponds to an inner diameter of the central ring section, and the large inner diameter of the conical ring section is disposed on an axial end of the outer ring opposite the flange section.

In order to provide a light-as-possible, but more stable and more loadable outer ring in comparison to the known bearing rings, a wall thickness of the bearing ring in the region of the central ring section and a wall thickness of the bearing ring in the region of the small inner diameter of the conical ring section are essentially equal, while a wall thickness of the bearing ring at the large inner diameter of the conical ring section is greater than the wall thickness at the small inner diameter. Here this increase in wall-thickness makes it possible to significantly increase the stability of the bearing ring in the highly loaded region.

Here the central ring section forms the recess, known from the prior art, that is disposed axially in a region wherein the wall thickness of the outer ring without recess is greater than a value required for a sufficient stability of the outer ring, so that the mechanical properties of the outer ring are not negatively influenced by the recess, but costs and weight are reduced, which is desirable in particular with a use in a wheel bearing. A further advantage of the disclosed outer ring is that an additional free space is provided by the recess, which has a positive effect in particular in a confined installation environment and furthermore simplifies the attaching of attachment means that are usually disposed in the flange region.

According to a further preferred exemplary embodiment, the flange region is also configured conical on its inner side, and forms a second raceway for a second set of tapered rollers. Especially with a use as a wheel bearing assembly, double row rolling-element bearings are usual that can support a particularly high load. Here tapered roller bearings are preferred in particular in the heavy-load sector (truck sector).

According to a further advantageous exemplary embodiment, the central ring section has a larger outer diameter and a smaller outer diameter so that the wall thickness of the central section tapers slightly toward the conical ring section, and the wall thickness of the entire outer ring at the smaller outer diameter of the central ring section is preferably minimal.

This tapering ensures that, with the forged bearing rings, a shaping forging tool is easily releasable from the bearing ring. They thus form so-called demolding chamfers.

Furthermore, it is advantageous when the conical ring section has a small outer diameter and a large outer diameter, wherein the small outer diameter is essentially identical to the smaller outer diameter of the central ring section, and the large outer diameter of the conical ring section is dimensioned such that the wall thickness that is defined between the inner diameter and the outer diameter is greater in the region of the large outer diameter of the conical ring section than the wall thickness at the larger outer diameter of the central section. A bearing ring can thereby be provided in which the recess can be deeper than in conventional bearing rings.

Since the minimum wall thickness at the edge region usually also defines the minimum wall thickness at the tapering, in order to achieve a sufficient stability this leads to an intrinsically too-thick wall thickness in the region of the tapering. Due to the thickening of the wall thickness in the load region of the bearing ring, the wall thickness in the region of the tapering can thus also be embodied thinner, which in turn leads to a further reduction of the weight overall.

According to a further advantageous exemplary embodiment, the conical ring section furthermore includes an edge section at its region having the large inner diameter, which edge section is formed conical and has a first larger inner diameter and a second smaller inner diameter, wherein the smaller inner diameter is essentially identical to the larger inner diameter of the conical ring section, and the larger inner diameter is the inner diameter of an end surface of the outer ring. Alternatively the edge section is formed axially parallel, and its inner diameter is essentially identical to the large inner diameter of the conical ring section.

It is advantageous here in particular when a wall thickness of the edge section decreases toward the end surface of the outer ring, and/or wherein a wall thickness of the edge section is lesser than a wall thickness of the central ring section.

The material not needed here can be provided for the thickening of the conical ring section so that a reduction of weight is also possible here with unvarying stability. Here the obliquely extending surfaces ensure an easy removal of a forging mold after the molding process.

Furthermore, the forming of an edge section is advantageous since it can be configured to carry a seal or a seal assembly. Of course, other elements, such as, for example, sensor elements, in particular an encoder ring, can also be attached to the edge section.

A further aspect of the present disclosure relates to a method for manufacturing the above-described, forged outer ring for a rolling-element bearing, in particular for a wheel bearing, wherein the conical ring section is widened by an open die forging step.

The disclosed method is based on the premise that in the context of a drop-forging method, first a relatively thin-walled outer ring blank, compared to known outer rings, is manufactured for the outer ring, and the outer ring is subsequently widened by an axial open die forging step such that it obtains its final shape. This method has the advantage that a retrofitting, starting from known drop-forging methods, is possible relatively easily, and the open die forging mold in the ring interior need only be supplemented or exchanged. A further advantage is that the recess is manufactured in the outer casing surface of the outer ring without material removal, which would represent an additional and expensive work step. The tool expense is thereby greatly reduced, and the expense for the handling of the chips arising during machining manufacturing is avoided. In addition, with the open die forging step a significantly higher manufacturing speed can be achieved than with machining methods.

It is advantageous here in particular when the open die forging step includes the following steps:

widening the ring section using a conical forging mold in order to produce the conical ring section, and compressing and optionally calibrating of the conical ring section using a U-shaped receptacle formed on the conical forging mold, whereby the wall thickness of the conical ring section is increased, and the edge section is formed in a controlled manner in terms of its shape.

The widening and simultaneous compressing makes it possible, in one method step, to both provide the conical shape of the raceway and form the material thickening that ensures an increased stability of the raceway and thus a higher load-bearing capacity of the bearing ring.

The forging mold used for this purpose is also an aspect of the present disclosure and includes a conical section and an essentially U-shaped receiving section in which the conical section is configured to define the conical ring region of the outer ring. A structured surface of the conical section of the forging mold can optionally reinforce the above-mentioned material-compression, and the U-shaped receiving section is configured to form the edge section of the outer ring and the increased wall thickness of the outer ring, in particular due to the compression, of the outer ring in the conical region of the bearing raceway.

Furthermore, an exemplary embodiment of the forging mold is advantageous wherein the conical section has a small outer diameter and a large outer diameter, and the U-shaped section extends radially outward at the large outer diameter of the conical section, and the U-shaped receiving section is also configured conical. Here the open side of the U-shaped receptacle is directed toward the smaller diameter of the conical section, and a base region of the U-shaped receptacle extends radially. Furthermore, the largest inner diameter of the U-shaped receptacle is configured to define the large outer diameter of the conical ring section of the outer ring.

With the aid of the forging mold thus formed, the final design of the outer ring can be provided in a single step, and a subsequent shaping and machining of the outer ring for generating the recessed central region can be omitted.

Further advantages and advantageous embodiments are specified in the description, the drawings, and the claims. The use of reinforcing ribs in the outer region of the forged part can also be implemented, since with their suitable shaping the process of widening these reinforcing ribs does not negatively influence them. Here in particular the combinations of features specified in the description and in the drawings are purely exemplary, so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

BACKGROUND

In the following, identical or functionally equivalent elements are designated by the same reference numbers.

FIGS. 1 to 5 show various steps of a so-called open die forging method for manufacturing a preferred exemplary embodiment of a forged outer ring 100 in which an outer ring blank 1 (shown in FIG. 1) produced by a drop-forging method is used.

During drop forging, a heated workpiece, which may comprise a bearing blank in the form of a steel rod section, is molded in a mold (so-called die) whose inner contours correspond to the desired external shape of the workpiece. A forging hammer, whose outer contours correspond to the desired internal shape of the workpiece, then strikes against the workpiece lying in the die and reshapes the workpiece such that it corresponds to the inner contours of the die and the outer contours of the forging hammer. However, the degrees of workpiece reshaping realizable using this method are limited since the forging hammer must be retracted, and the workpiece must be removed (demolded) from the die, wherein it is brought to its final shape in a plurality of steps. Radial recesses, so-called undercuts, on the inner or outer side of the workpiece are therefore not possible since the radius of the inner side of the workpiece must increase in at least one axial direction in order to ensure the deformability. For radial recesses on the outer side of the workpiece, split dies are required, which leads to a higher manufacturing expense. However, these radial recesses are particularly desirable in order to be able to manufacture bearing rings as thin-walled as possible, and thereby to reduce the weight of the entire bearing.

Figure 1:
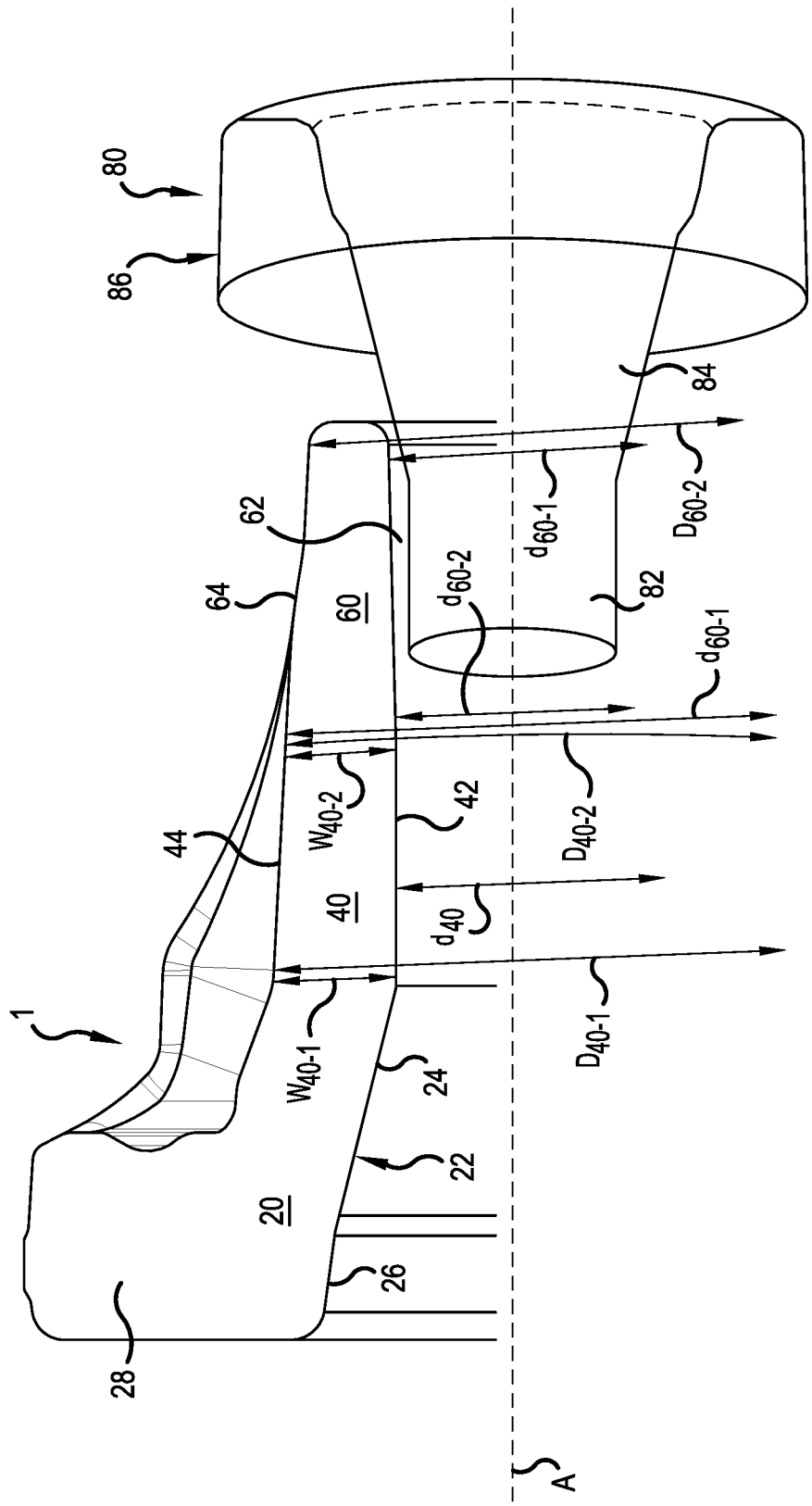
FIGS. 1-5 are schematic depictions of various stages of a manufacturing process for producing a preferred exemplary embodiment of the outer ring.

The initial design, shown in FIG. 1, of the outer ring blank 1 is manufactured using such a drop forging process. Here the outer ring blank 1 already roughly suggests the final shape and includes a flange section 20, a central, later optionally axially-parallel-extending, ring section 40, as well as a ring section 60 spaced from the flange, which ring section 60 is shaped in the course of the open die forging process described below into a conical ring section 60.

After the drop forging process, the flange region 20 is already in its final form and includes on its inner side 22 a first obliquely extending region 24 that forms the future raceway for a set of tapered rollers (not depicted) and whose inclination is adapted to the inclination of the tapered rollers. Furthermore, a second obliquely extending region 26 is provided on the flange region 20, which region 26 serves for receiving further elements, such as, for example, seal elements or sensor elements, in particular an encoder ring. However, the inclination of the second region 26 is dependent on forging technology due to the deformability required. The flange region 20 also has a radially extending flange 28 that can be configured for receiving attachment elements.

The central ring section 40 includes an inner surface 42 which, in the exemplary embodiment depicted, extends essentially parallel to the later rotational axis A and includes an obliquely extending outer surface 44, wherein the central ring section 40 has a first larger outer diameter D40-1 and a second smaller outer diameter D40-2. The central ring section 40 also has a tapering wall thickness W, which tapers from a maximum wall thickness W40-1 to a minimum wall thickness W40-2. The obliquely extending outer surface 44 is due to the demolding chamfers necessary with drop forging.

As can be seen in FIG. 1, the ring section 60 is also slightly conically shaped in order to remove the forging die from the workpiece, i.e., to be demolded, and has an obliquely extending inner surface 62 and an obliquely extending outer surface 64. Here the wall thickness also tapers from a larger wall thickness W60-1 to a smaller wall thickness W60-2. Since, unlike the central portion 40, in the ring portion 60, not only the outer diameter has a large value D60-1 and a small value D60-2 but also the inner diameter d has a large value d60-1 and a small value d60-2, the difference in wall thickness in the blank 1 is already greater in the ring portion 60 than in the central portion 40.

Figure 6:
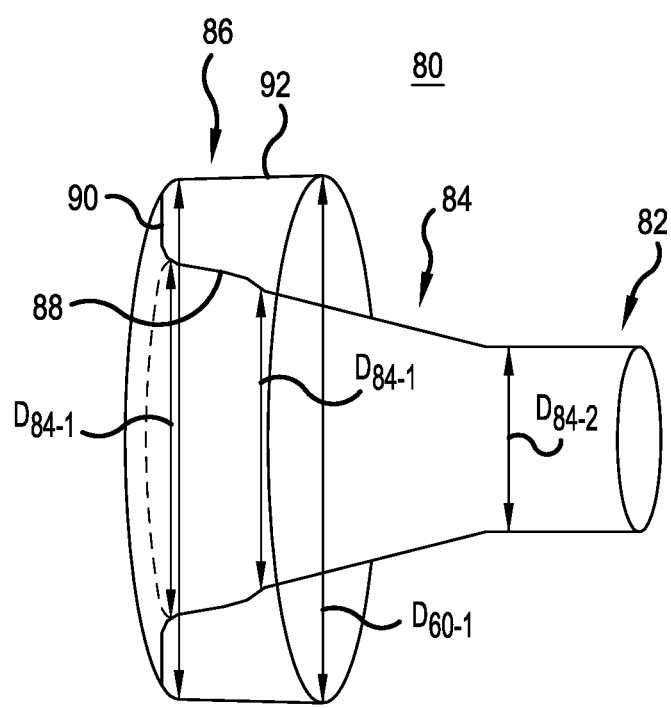
FIG. 6 is a schematic view of an exemplary embodiment of an open die forging mold used to produce an outer ring according to an embodiment of the disclosure.

Since in the finished outer ring 100 the inner surface 62 will serve as a raceway for tapered rollers, it must also have an inclination adapted to the tapered rollers. For this purpose a forging mold 80 depicted in FIG. 6 is used. This forging mold 80 can be configured as a hollow mold or as a solid component and includes a first cylindrical section 82, an adjoining conical section 84, and a U-shaped receptacle connected to the conical section, in particular a demoldable recess 86. The conical section 84 has a first smaller diameter D84-2 and a large diameter D84-1, wherein the small diameter D84-2 corresponds to the diameter of the cylindrical section 82. The U-shaped receptacle 86 is thus disposed on the large diameter D84-1 and can itself have a different inclination from the inclination of the conical part so that the U-shaped receptacle also has a first small diameter D86-2 and a larger diameter D86-1 on its first leg 88, wherein the smaller diameter D86-2 in turn corresponds to the large diameter D84-1.

Furthermore, FIG. 6 shows that the U-shaped receptacle 86 comprises a radially extending receiving base 90, and leg 92 radially outward from the receiving base 90, which leg 92, together with the section 88 and the base 90, forms the U shape of the receptacle 86. Since the second leg 92 is also configured slightly conical in order to allow the demolding of the open die forging mold 80 from the bearing blank, the leg 92 also has a smaller inner diameter d92-2 and a larger inner diameter d92-1, wherein the larger diameter d92-1 is disposed at the free end of the receptacle, and the smaller diameter d92-2 is disposed at the base 90. Here the diameters of the open die forging mold 80 are dimensioned such that they can form the tapered roller raceway and an edge element for receiving further elements, such as, for example, seal elements or sensor elements, in particular an encoder ring, for the finished outer ring 100. If needed, the conical surface 84 can also have a structured, possibly stepped surface in order to support the swaging process, described below, during the widening of the outer ring region 60.

Figure 2:
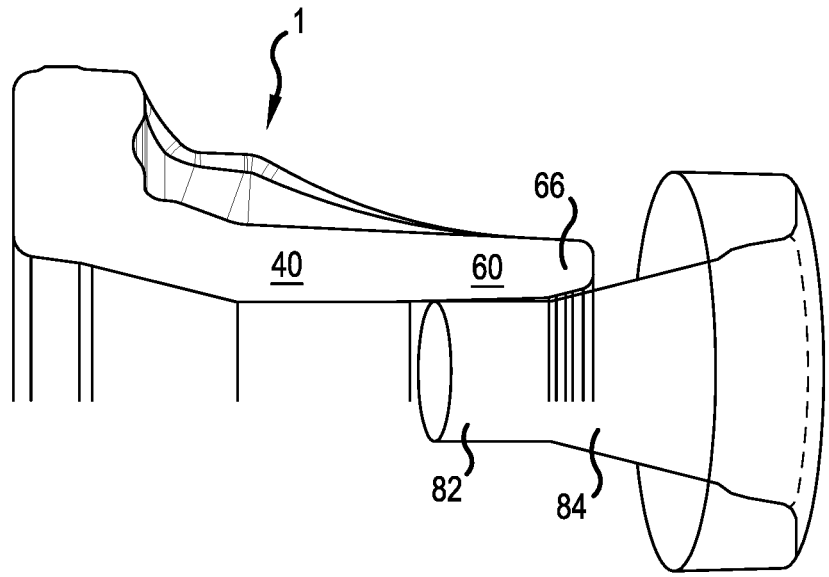
Figure 3:
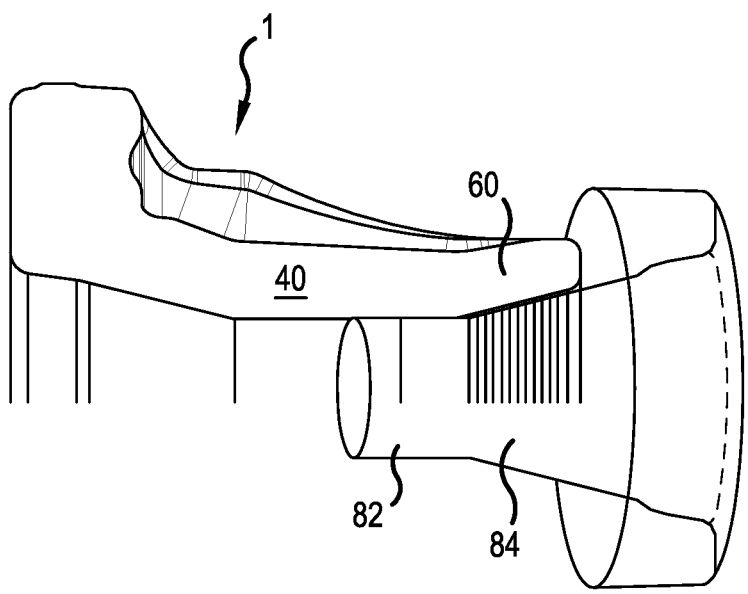
Figure 4:
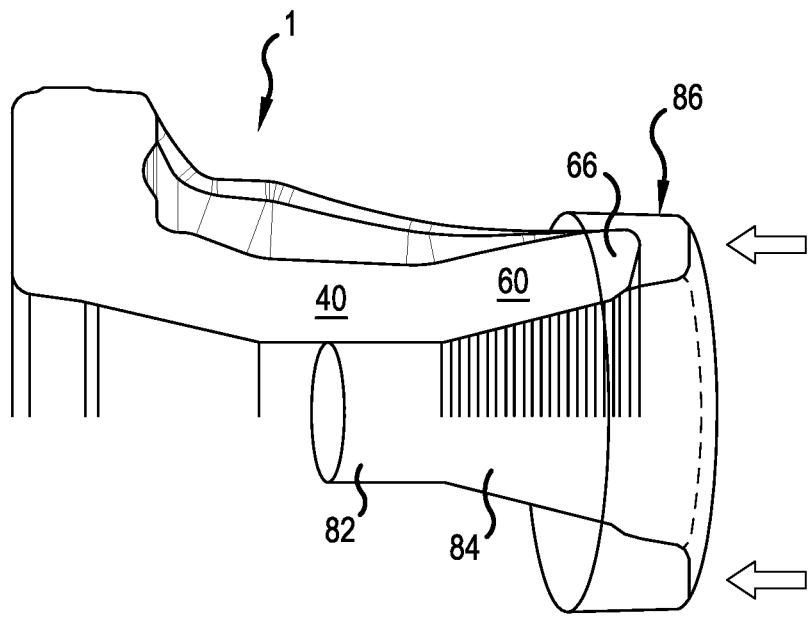

In FIGS. 1 to 5 the mode of action of the forging mold 80 is schematically illustrated, wherein in FIG. 1 only the component 80 itself is depicted in relation to the outer ring blank 1, but the forging open die 80 only has an influence on the shaping of the outer ring blank 1 starting from FIG. 2. As can be seen in FIG. 1, the cylindrical section 82 of the open die component 80 has no influence on the shaping. As depicted in FIG. 2, the section 60 is widened at its edge region 66 only when the conical section 84 meets the outer ring blank 1, in particular an edge region 66 of the section 60. With further driving in of the open die forging mold 80, this widened region is enlarged further, as is depicted in FIGS. 3 and 4, until the entire conical receptacle 84 of the open die forging mold 80 is located inside the outer ring blank 1.

During this driving-in, material is pushed upward and, optionally supported by a surface structure of the conical region 84, toward the central section 40. Here the cylindrical section 82 of the open die forging tool 80 ensures that the material does not reduce the inner diameter d40 of the central section 40, and a radially inwardly directed bulge arises. As shown in FIG. 4, if the open die part 80 is driven so far into the bearing ring 1 that the edge region 66 of the section 60 is received in the U-shaped receptacle 82, and the raceway region 62 is completely widened, in a final calibration step/process the open die forging tool 80 is acted upon with a high axial force toward the flange region 20 (see arrows in FIG. 4). With this axial force application the edge region 66 is formed into the U-shaped receptacle 86, whereby an edge section 70 is formed that is suitable in its shape for the carrying of further elements, such as, for example, seals or sensor elements, in particular an encoder ring.

Furthermore, however, material is also accumulated in front of the U-shaped receptacle 86, whereby a region of increased wall thickness arises on the conical ring section 60. In particular, the thinner wall thickness W60-2 of the conical ring section in the outer ring blank 1 is thereby increased such that the resulting wall thickness W60-2 of the finished outer ring 100 is greater than the initially greater wall thickness W60-1 on the side facing the central section (see FIG. 1). The outer ring 100 depicted in FIG. 5 thereby arises, wherein a wall thickness W of the conical edge section 60 is maximized at a transition to the edge section 70.

Figure 5:
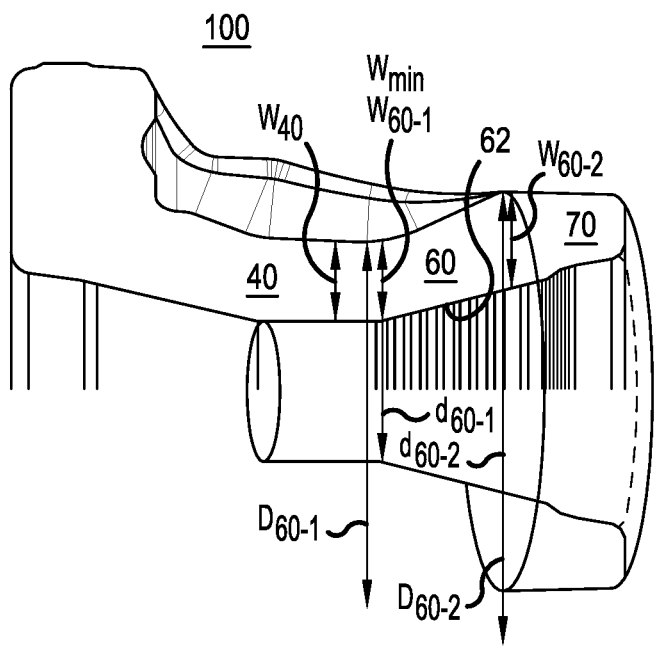

In this swaging process the outer ring blank 1 is also compressed in its length, and achieves the intended reduced length shown in FIG. 5.

As can furthermore be seen in FIG. 5, the conical ring section 60 of the final forged outer ring 100 thus has an inner surface 62 having a small inner diameter d60-2 and a large inner diameter d60-1, as well as a small outer diameter D60-1 and a large outer diameter D60-1 that were initially dimensioned the other way around. As can furthermore be seen in FIG. 5, the wall thickness W60-1 in the region of the small diameter d60-1, D60-1 is thus smaller than the wall thickness W60-2 in the region of the large diameter d60-2, D60-2. In contrast, the edge region 70 connecting thereto has, as known from FIG. 1, the tapering wall thickness, but is defined in its shape via the U-shaped receptacle of the open die forging mold 80.

Since it has been established in particular that in bearing outer rings 100 in the vehicle sector, the bearing rings 100 are particularly stressed in the region of the large diameter D60-2; d60-2 of the conical ring section 60, the large wall thickness W60-2 makes possible an increased stability.

Furthermore, it can be seen from FIG. 5 that the central section 40 has a wall-thickness tapering as before, so that the minimum wall thickness Wmin of the entire component (aside from the edge regions) is reached at a transition between the central section 40 and conical ring section 60. However, this region is very lightly loaded, with the result that the wall thickness in the region 40 can be embodied very small.

In contrast, in the prior art the minimum wall thickness is calculated to be found in the region that is the most heavily loaded, namely at the transition from the conical ring section 60 to the edge region 70. However, this also means that the dimensioning of the wall thickness required for a sufficient stability must be oriented to precisely this region, which leads to relatively large wall thicknesses even in the region of the unloaded central section 40. Since the heavily loaded region is actively thickened by the new method, the wall thickness can be reduced overall, and in particular in the central section 40, which leads to a large weight saving.

In addition, using the open die forging mold, a wall-thickness increase in the high-load region and a wall-thickness reduction in the central region can be introduced into the bearing ring without machining processes having to be applied. At the same time, the wall thickness in the region of the central section 40, which is significantly responsible for a weight reduction, can be reduced further, since the wall thickness can be reduced further.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved forged outer rings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Outer ring blank
1 Outer ring
20 Flange region
22 Oblique surface
24 Raceway
26 Retaining section for elements
28 Flange
40 Central ring section
42 Inner surface
44 Outer surface
60 Conical ring section
62 Raceway
64 Outer surface
66 Edge region
70 Edge section for elements
80 Open die forging mold
82 Cylindrical section
84 Conical section
86 U-shaped receptacle
88 First leg
90 Base
92 Second leg
D Outer diameter
d Inner diameter
W Wall thickness

What is claimed is:

1. A forged outer ring for a tapered wheel bearing, the forged outer ring comprising:
   a conical ring section having a first end having a first inner diameter, a first outer diameter and a first wall thickness and having a second end having a second inner diameter, a second outer diameter and a second wall thickness,
   a flange section configured to attach the outer ring to a component, and
   a central ring section having a first end at the flange section, the first end of the central ring section having a first inner diameter, a first outer diameter and a first wall thickness, and a second end at the conical ring section, the second end of the central ring section having a second inner diameter, a second outer diameter and a second wall thickness,
   wherein an inner surface of the conical ring section is configured to form a raceway for a first set of tapered rollers,
   wherein the second inner diameter of the conical ring section is greater than the first inner diameter of the conical ring section,
   wherein the first inner diameter of the conical ring section is substantially equal to the second inner diameter of the central ring section,
   wherein the second wall thickness of the central ring section and the first wall thickness of the conical ring section are substantially equal, and wherein the second wall thickness of the conical ring section is greater than the first wall thickness of the conical ring section.

2. The forged outer ring according to claim 1, wherein an inner wall of the flange section is conical and is configured to form a second raceway for a second set of tapered rollers.

3. The forged outer ring according to claim 1, wherein the first outer diameter of the central ring section is greater than the second outer diameter of the central ring section, and
wherein the first wall thickness of the central ring section is greater than the second wall thickness of the central ring section.

4. The forged outer ring according to claim 3, wherein the second wall thickness of the central ring section is a minimum wall thickness of the forged outer ring.

5. The forged outer ring according to claim 3, wherein the first outer diameter of the conical ring section is substantially equal to the second outer diameter of the central ring section, and
wherein the second wall thickness of the conical ring section is greater than the first wall thickness of the central ring section.

6. The forged outer ring according to claim 1, including a conical axial end section having a first end at the second end of the conical ring section and a second end, the first end of the conical axial end section having a first inner diameter, a first outer diameter and a first wall thickness, and the second end of the conical axial end section having a second inner diameter, a second outer diameter and a second thickness,
wherein the second inner diameter of the conical axial end section is greater than the first inner diameter of the conical axial end section, and
wherein the first inner diameter of the conical axial end section is substantially equal to the second inner diameter of the conical ring section.

7. The forged outer ring according to claim 6, wherein the second wall thickness of the conical axial end section is less than the first wall thickness of the conical axial end section.

8. The forged outer ring according to claim 6, wherein the second wall thickness of the conical axial end section is less than the second wall thickness of the conical ring section.

9. The forged outer ring according to claim 6 wherein the conical axial end section is configured to carry a seal or a seal assembly or an encoder disk.

10. The forged outer ring according to claim 1, including a conical axial end section having a first end at the second end of the conical ring section and a second end, the first end of the conical axial end section having a first inner diameter, a first outer diameter and a first wall thickness, and the second end of the conical axial end section having a second inner diameter, a second outer diameter and a second thickness,
wherein the first inner diameter of the conical axial end section is substantially equal to the second inner diameter of the conical ring section, and
the first inner diameter of the conical axial end section is substantially equal to the second inner diameter of the conical axial end section.

11. A method for manufacturing an outer ring of a rolling-element bearing comprising:
providing a forged outer ring including a conical ring section having a first end having a first inner diameter, a first outer diameter and a first wall thickness and a second end having a second inner diameter, a second outer diameter and a second wall thickness and including a flange section configured to attach the outer ring to a component and including a central ring section having a first end at the flange section, the first end of the central ring section having a first inner diameter, a first outer diameter and a first wall thickness, and a second end at the conical ring section, the second end of the central ring section having a second inner diameter, a second outer diameter and a second wall thickness, and
inserting an open die forging mold into the second end of the conical ring section to widen the conical ring section.

12. The method according to claim 11, wherein the open die forging mold includes a U-shaped end receptacle, and
including swaging the conical ring section in the U-shaped end receptacle to increase a wall thickness of an end of the conical ring section.

13. A forging mold for forming a forged outer bearing ring comprising:
a cylindrical first section,
a central section having a first end at the cylindrical first section and a conical wall extending away from the first end, and
a substantially U-shaped receiving section at a second end of the central section configured to define a conical ring region of the outer ring and to increase a wall thickness of the outer bearing ring.

14. The forging mold according to claim 13, wherein the conical wall has a first outer diameter and a second outer diameter greater than the first outer diameter,
wherein the U-shaped section extends radially outward at the second outer diameter of the conical section,
wherein the U-shaped section is also conical and has an open side directed toward the smaller diameter of the conical section, and
wherein a bight of the U-shaped receptacle extends radially, and
wherein a largest inner diameter of the U-shaped section is configured to define a large outer diameter of the conical ring section of the outer ring.

15. The forging mold according to claim 14, wherein the conical section includes a surface structure configured to promote a compressing and thickening of the material to be processed.

* * * * *